D. A. GILLEN.
VEHICLE ALARM.
APPLICATION FILED JAN. 31, 1920.

1,361,762.

Patented Dec. 7, 1920.

WITNESSES
Frederick Diehl.
Geo. L. Beeler

INVENTOR
D. A. Gillen
BY
ATTORNEYS

UNITED STATES PATENT OFFICE.

DANIEL ALOYSIUS GILLEN, OF NEW YORK, N. Y.

VEHICLE-ALARM.

1,361,762.

Specification of Letters Patent.  Patented Dec. 7, 1920.

Application filed January 31, 1920. Serial No. 355,473.

*To all whom it may concern:*

Be it known that I, DANIEL A. GILLEN, a citizen of the United States, and a resident of the city of New York, Flushing, borough of Queens, in the county of Queens and State of New York, have invented a new and Improved Vehicle-Alarm, of which the following is a full, clear, and exact description.

This invention relates to safety appliances for automobiles or other vehicles and has particular reference to audible alarm devices calculated to prevent an automobile or other vehicle from being operated by an unauthorized person without detection and apprehension.

Among the specific objects of the invention is to provide an attachment for at least one of the wheels of the vehicle which is in the nature of a large bell or gong, which when in use and carried by the rotating wheel, will be brought with such an impact against the ground or roadway as to cause a loud clanging noise sufficient to inform the public or the officials that the vehicle being so moved is being stolen.

Another object of the invention is to adapt the gong to a specific form for the particular purpose for which it is to be used.

Another object of the invention is to provide a construction which is adapted to be easily applied to or removed from the wheel by the one who has the key or other necessary means, but which cannot be readily removed from the wheel by any one surreptitiously.

With the foregoing and other objects in view, but without unnecessarily limiting the construction in the precise manner illustrated, a preferred embodiment of the invention is illustrated in the accompanying drawings, wherein similar parts are referred to in the several views by like reference characters, and in which—

Figure 1:
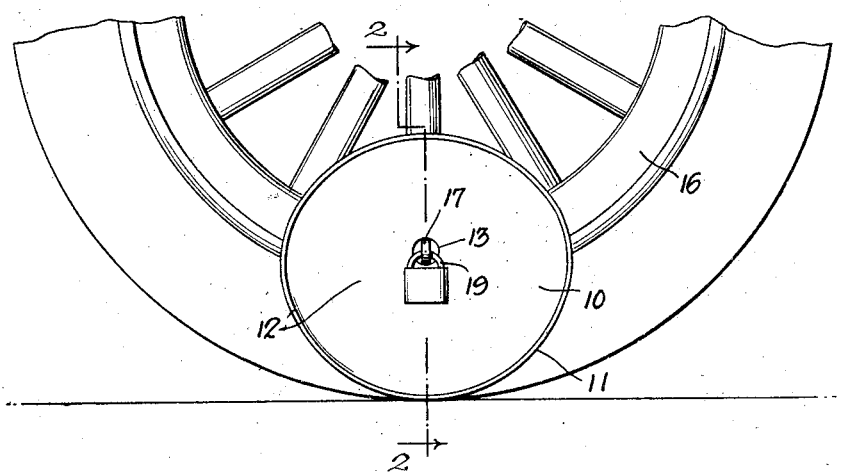
Figure 1 is a side elevation of a portion of the vehicle wheel to the felly of which my improvement is shown attached.
Figure 2:
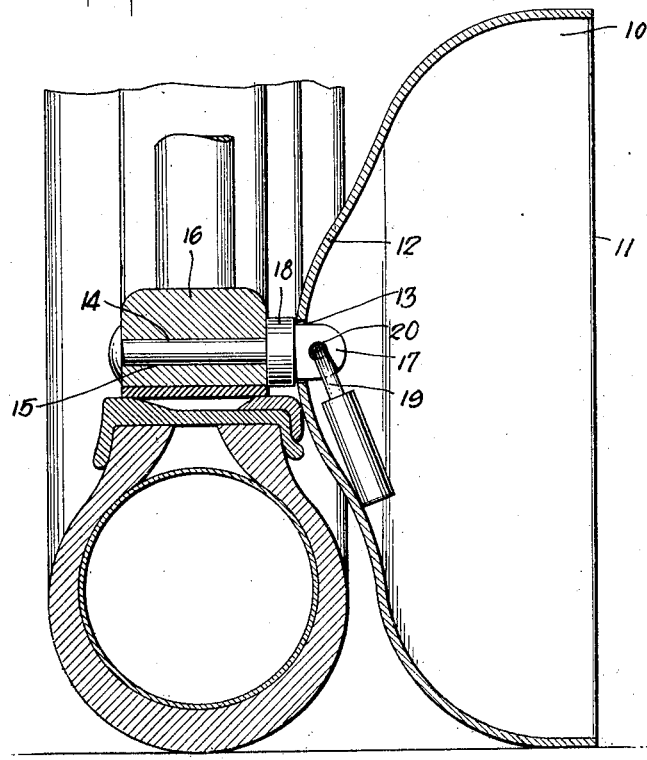
Fig. 2 is a vertical section on the line 2—2 of Fig. 1.

Referring now more specifically to the drawings, I show my invention as comprising a gong 10 of circular form and of a relatively flat nature, and a wide open bell or mouth 11 and a crown 12 provided with an eccentric round bearing hole 13. The crown as viewed in cross section is made up of compound curvature making the central or eye portion of the crown of sharper curvature than the main portion thereof.

As a suitable means for attaching the gong to the wheel, I provide a pin 14 fixed rigidly and permanently through a hole 15 formed through the felly 16 and having a head or lug 17 adapted to project through the hole 13 aforesaid. Adjacent to the head 17 is a round shoulder 18 against which the crown of the gong is adapted to bear when locked in place by some suitable detachable fastener shown herein as in the nature of a padlock having a shackle 19 projecting through a hole 20 formed transversely through the head 17.

As indicated the design of the gong is such that the connection between the crown thereof and the wheel, will be made close to the felly and hence not far remote from the inner portion of the tire of the wheel. The compound curvature above indicated insures that there will be little or no available space observed between the gong and said tire. In practice, if the vehicle be started while the gong is attached as shown, the periphery of the gong will be brought into contact with the roadway causing a loud clanging of the gong. Moreover, not only will the gong render a loud report when striking the ground, but also the padlock hung as indicated will drop and strike against the gong twice during each rotation of the wheel, and hence the gong will be caused to sound by this means auxiliary to its impact against the ground or roadway. The hole 13 being round provides for free rotation of the gong around the axis of the pin 14 or its head 17. Hence no damage can result to the attachment even though the vehicle be started without removing the attachment, as may be required in the event of a fire or other emergency along city streets, and to comply with certain local ordinances forbidding the locking of a vehicle so that it cannot be moved by officials when necessary.

This alarm device, comprising a large relatively flat gong is designed to present a characteristic appearance and so be recognizable by the public and especially the police officers, and so reduce the likelihood of surreptitious meddling or tampering with vehicles left standing on the street. The means for detaching the detachable part of the device from the wheel are such that neither can the gong be removed readily by a thief, nor can it be interfered with in such a way as to prevent the audible manifestation if the vehicle is operated without removing the gong.

I claim:

1. In a safety attachment for vehicle wheels, the combination of a transverse bearing support carried by the wheel parallel to its axis, a gong having a bearing hole through which the said bearing support projects loosely, and means to detachably secure the gong upon said bearing.

2. A device of the nature set forth in claim 1, in which the gong is adapted to strike against the ground when the vehicle wheel is rotated.

3. A device such as set forth in claim 1, in which the means for detachably securing the gong to the bearing support is movable with respect to the gong and so constitutes a clapper therefor.

4. A device as set forth in claim 1, in which the gong is relatively flat and so fits close to the side of the wheel.

5. A device as referred to in claim 1, in which the crown portion of the gong is provided with a compound curvature causing the crown to fit close to the felly of the wheel while the larger portion of the gong is adapted to rotate close to the tire.

DANIEL ALOYSIUS GILLEN.